United States Patent [19]

Gerlock et al.

[11] 4,316,992
[45] Feb. 23, 1982

[54] PROCESS FOR POLYOL RECOVERY FROM POLYURETHANE FOAM COMPRISING ALCOHOL AND STEAM HYDROLYSIS

[75] Inventors: John L. Gerlock, Dearborn; Jacob Braslaw, Southfield, both of Mich.; Jane Albright, Bremerton, Wash.

[73] Assignee: Ford Motor Company, Dearborn, Mich.

[21] Appl. No.: 237,027

[22] Filed: Feb. 23, 1981

[51] Int. Cl.³ .................................... C07C 43/11
[52] U.S. Cl. .................................. 568/621; 260/2.3; 568/613
[58] Field of Search .................. 568/621, 613; 260/2.3

[56] References Cited

U.S. PATENT DOCUMENTS

| | | |
|---|---|---|
| 2,973,151 | 5/1960 | Broeck et al. |
| 3,109,824 | 11/1963 | Heiss |
| 3,117,940 | 1/1964 | McElroy |
| 3,123,577 | 3/1964 | Heiss |
| 3,300,417 | 1/1967 | McElroy |
| 3,404,103 | 10/1968 | Matsudaira et al. |
| 3,441,616 | 4/1969 | Pizzini et al. |
| 3,632,530 | 1/1972 | Kinoshita |
| 3,708,440 | 1/1973 | Frulla et al. |
| 3,738,946 | 6/1973 | Frulla et al. |
| 3,954,681 | 5/1976 | Castle |
| 3,983,087 | 9/1976 | Tucker et al. |
| 4,014,809 | 3/1977 | Kondo et al. |
| 4,035,314 | 7/1977 | Lohr, Jr. et al. |
| 4,039,568 | 8/1977 | Sakai et al. |
| 4,110,266 | 8/1978 | Sheratte |
| 4,115,298 | 9/1978 | Schneider et al. |
| 4,159,972 | 7/1979 | Braslaw et al. |
| 4,162,995 | 7/1979 | Sheratte |

FOREIGN PATENT DOCUMENTS

| | | |
|---|---|---|
| 1110405 | 7/1961 | Fed. Rep. of Germany ....... 260/2.3 |
| 2738572 | 3/1979 | Fed. Rep. of Germany . |

*Primary Examiner*—Howard T. Mars
*Attorney, Agent, or Firm*—Lorraine S. Melotik; Roger L. May

[57] ABSTRACT

Polyol is recovered from polyether based polyurethane foam by a process which includes reacting the foam with an alcohol, preferably a glycol ether, whose boiling point is between 225° C. and 280° C. at a temperature between 185° C. and 220° C. under a non-oxidizing atmosphere. Thereafter, superheated steam is bubbled through the solution to hydrolyze substantially all the carbamate produced during dissolution to amines and alcohols, preferably in the presence of sodium hydroxide. During hydrolysis, the temperature of the solution is maintained at between 185° C. and 220° C. and the solution volume is maintained by adding alcohol to replace that removed by the steam. At least a portion of the solution is subjected to vacuum purification at a temperature below about 230° C. The portion of the solution subjected to vacuum purification may be the polyol layer which forms after the hydrolyzed solution has been allowed to stand. Substantially pure polyol is recovered.

22 Claims, 2 Drawing Figures

PROCESS FOR POLYOL RECOVERY FROM POLYURETHANE FOAM COMPRISING ALCOHOL AND STEAM HYDROLYSIS

This invention relates to the recovery of polyol from polyurethane foam, which polyol can subsequently be used to produce high quality new foam. More particularly, this invention relates to a process whereby polyether based polyurethane foam is dissolved in a saturated alcohol, the resulting dissolution mixture is steam hydrolyzed and polyol is recovered in substantially pure form.

RELATED APPLICATIONS

Reference is made to related U.S. applications Ser. No. 237,008 filed Feb. 23, 1981 and entitled "Catalyzed Dissolution-Hydrolysis of Polyurethane Wastes" and Ser. No. 237,568, filed Feb. 24, 1981 and entitled "Polyol Extraction by High Boiling Alkanes".

BACKGROUND OF THE INVENTION

Currently, it is estimated that manufacturing associated waste generates over 50 million pounds of low density polyurethane foam each year. This foam is generally disposed of in land-fill operations. Because of the economic loss associated with both the land required for landfill and the foam disposed of in these operations, it is highly desirable to utilize the scrap foam or its chemical components in new product manufacture. One such chemical component which can be recovered from the scrap foam and which is of particular commercial interest is polyol, which can be used to manufacture new foam.

Prior art polyol recovery processes have included dissolving the foam and subsequently using the resulting solution without further purification to make new foam. In German Pat. No. 2,738,572, polyurethane wastes are heated in a diol containing a basic catalyst to prepare a homogeneous polyol component to be used in the production of new foam. U.S. Pat. No. 2,937,151 to Broeck et al teaches dissolving scrap foam in high molecular weight polyesters, polyester amides or polyalkylene ether glycols similar to those used to make the foam, the resulting solution is then crosslinked with isocyanate to generate new foam. Heiss, in U.S. Pat. No. 3,123,577, mills cellular polyurethane plastic, dissolves the particles in a high molecular weight trihydric polyalkylene ether containing a tin catalyst, and reacts the resulting resin with polyisocyanate to form new cellular polyether polyurethane. Tucker et al, in U.S. Pat. No. 3,983,087, heat scrap foam in a glycol wherein the alkylene chain separating the hydroxyl groups is branched. This homogeneous mixture can be used to make new foam. Braslaw et al, in U.S. Pat. No. 4,159,972, dissolve the foam in a low molecular weight diol, admix a high molecular weight polyol therewith, remove the diol under vacuum and use this product to make new foam. Kinoshita, in U.S. Pat. No. 3,632,530, heat the foam in a glycol and an amino compound in the presence of a tertiary amine catalyst. Upon standing, the mixture separates into a glycol containing amine layer and a layer comprising polyalkylene ether polyol. The polyol layer is used to produce new foam. Frulla et al, in U.S. Pat. No. 3,738,946, heat scrap foam in an aliphatic diol, preferably in the presence of a dialkanolamine. The resulting material is used without further purification to make new foam. U.S. Pat. No. 3,708,440 to Frulla et al is similar, employing an aliphatic diol and a dialkanolamine. McElroy, in U.S. Pat. No. 3,300,417, liquifies a polyurethane plastic by heating the polyurethane in an organic liquid in the presence of a metal catalyst, preferably a tin compound. The resulting liquid is reacted with a polyisocyanate to prepare a new cellular polyether polyurethane.

Hydrolysis has also been used on polyurethane foam to recover polyol. Lohr, in U.S. Pat. No. 4,035,314, hydrolyzes foam using super-heated steam, dissolves the resulting oily residue in solvent, and further treats this mixture by a process comprising gassing with hydrochloric acid gas and ultimately recovering polyol. Pizzini et al, in U.S. Pat. No. 3,441,616, hydrolyze a polyether polyurethane foam with a strong base in a dimethylsulfoxide-water medium, extract the resulting polyol with a hydrocarbon solvent immiscible with the hydrolysis medium, separate the polyol solvent layer and strip off the solvent to recover polyol.

In spite of the numerous known processes for scrap foam utilization and polyol recovery, however, scrap foam is still generally disposed of in land-fill operations, indicating that none of these polyol recovery processes is commercially feasible. Therefore, a commercially feasible process for high grade polyol recovery has continued to be the subject of research.

One object of the subject invention is the recovery from scrap or waste polyether polyurethane foam of substantially pure polyether polyols, which, unlike prior art recovery polyol, are physically and chemically indistinguishable from the virgin polyol used to make the original foam, and may then be used to produce a high quality flexible foam of high resilience.

A further object of the invention is the processing of the foam in a commercially economical and rapid manner.

BRIEF DESCRIPTION OF THE INVENTION

It has been found that substantially pure polyether polyol can be readily recovered from polyether polyurethane waste foam by a process which includes first dissolving the foam in a saturated alcohol at a temperature between about 185° C. and 220° C. under a non-oxidizing atmosphere. The alcohol has a boiling point of between about 225° C. and 280° C.

Thereafter, superheated steam is introduced through the solution, which solution may also include an alkali metal hydroxide catalyst for a time necessary to substantially hydrolyze all the dissolution products subject to hydrolysis into amines and alcohol. During hydrolysis, the temperature of the solution is maintained between about 185° C. and 220° C. and the solution volume is maintained through the addition of alcohol to the solution, replacing that removed by the steam. At least a portion of the resulting solution is subjected to vacuum purification at a temperature below about 230° C. so as to allow recovery therefrom of substantially pure polyol. In this process, the portion of the hydrolyzed solution which is subjected to vacuum purification may be the polyol layer which forms after the solution has been allowed to stand.

In the process of this invention, substantially pure polyol is taken to mean that the recovered polyol is substantially free of recovery process by-products which reduce the quality of the new foam generated from the recovered polyol and thus limit the amount of recovered polyol that can be used to replace virgin polyol in new foam production. Furthermore, it is meant to describe a polyol which may be used to replace virgin polyol in substantial amounts in new foam production and yields a polyurethane foam with similar properties to the foam made with all virgin polyol.

DETAILED DESCRIPTION OF THE INVENTION

Typical low density polyurethane foams which can be processed by means of this invention are formed by reacting difunctional isocyanates with water, excess difunctional isocyanates and polyether triols. The polyurethane structure consists essentially of polyurea chains crosslinked with the triols by means of urethane linkages. In some foams, this structure is modified and further crosslinked by the presence of allophanate linkages which may occur when additional excess isocyanates are introduced. The preparation of the foam may also include catalysts, surfactants, fillers and other modifiers including amines in minor amounts. In addition to flexible foam, semi-flexible and rigid foams can also be utilized in the recovery process of this invention.

The polyether polyurethane foam which can be processed by the process of this invention, however, are not limited to those produced as described above. The initial step of the invention comprises reacting the foam with a saturated alcohol, wherein the hydroxy functionality of the alcohol causes dissolution of the polyurethane, forming dissolution products which comprise polyol, ureas, and carbamates. Any saturated alcohol with a boiling point between about 225° C. and 280° C. can be used. The alcohol can contain single or multiple hydroxy functionality and it can be straight chain, branched, cyclic, or aromatic. Low molecular weight diols such as diethylene glycol, dipropylene glycol, dibutylene glycol, glycerol, or even polyether triols are preferred solvents. However, diethylene glycol is particularly preferred for reasons including availability and relatively low cost. Additionally, it is conveniently vacuum distilled from the recovered polyol at temperatures below about 230° C., thereby preventing discoloration and degradation of the polyol that can occur at higher temperatures.

Figure 1:
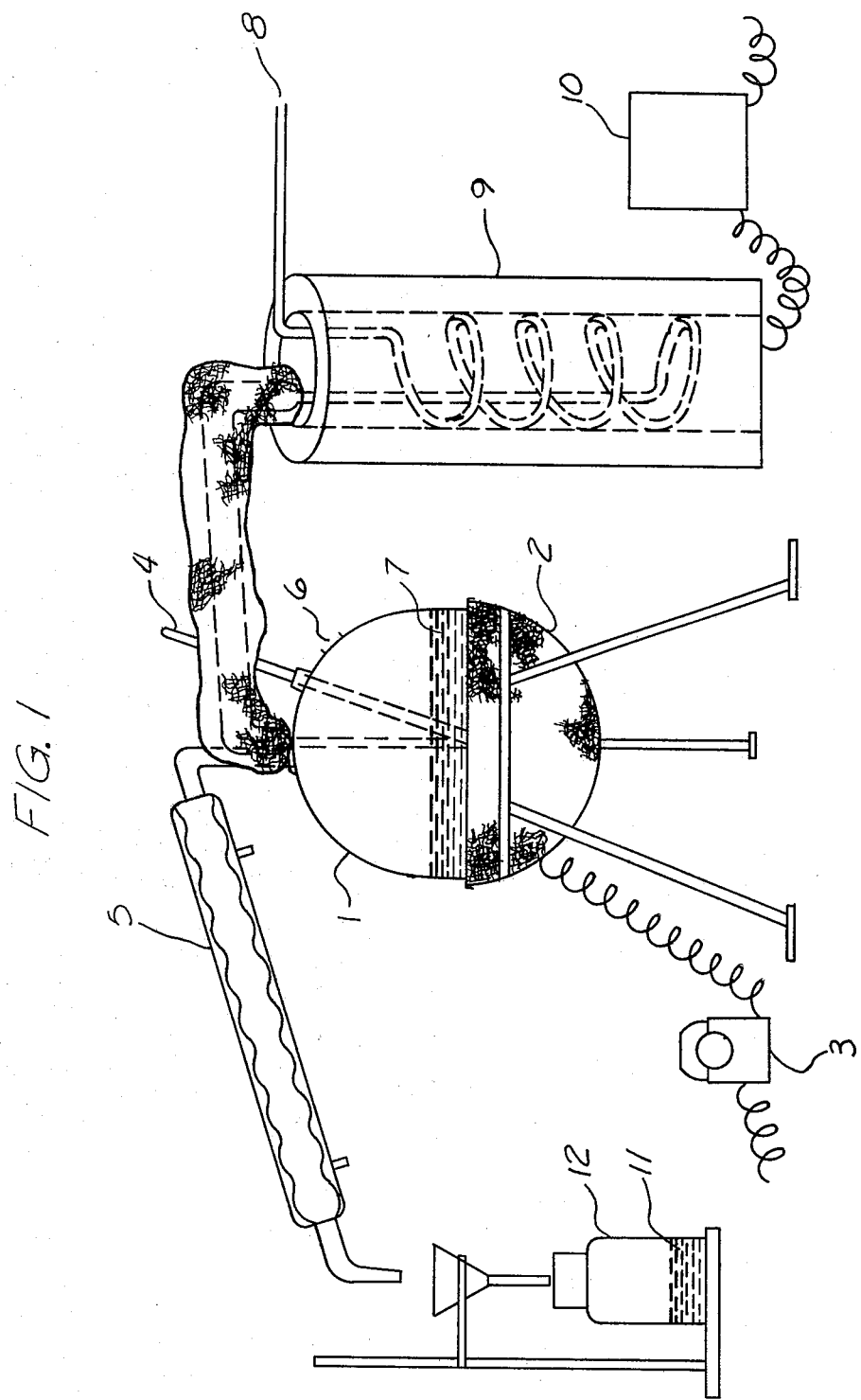
FIG. 1 shows a typical laboratory apparatus set-up which could be used in the process of the subject invention.

After first preheating the alcohol to between about 185° C. and 220° C., preferably about 200° C., with constant stirring, pieces of polyurethane foam are added until dissolution occurs, after which more pieces of foam are added. The process of the invention is carried out in a non-oxidizing atmosphere. As used herein "non-oxidizing atmosphere" means any atmosphere that excludes oxygen and does not lead to the formation of undesirable side reaction products, i.e., any polyol side reaction products or other side reaction products that may interfere with isolation of polyol from other reaction products. Suitable non-oxidizing atmospheres which can be provided are, for example, nitrogen, carbon dioxide, steam or the inert gases. A conventional laboratory sit-up as shown in FIG. 1 can be used in the process of this invention. The solution 7 is heated in a reactor 1 under a non-oxidizing atmosphere, provided through opening 6. A conventional heating unit 2 is controlled by thermostat 3. The temperature of the solution is indicated by thermometer 4 immersed in the solution. A conventional stirrer not illustrated is used. A source of steam 8 enters a heater 9 the temperature of which is controlled by thermostat 10 and is bubbled through solution 7 by means of tube 13 partially submerged in solution 7. The exiting gasses are cooled when passing through overhead condenser 5, and the resulting liquid 11 is collected in container 12.

The amount of polyurethane foam that may be dissolved in the alcohol is limited only by the viscosity of the resulting solution the more dissolved, the higher the viscosity. The ratio by weight of foam which can be dissolved, for example, in diethylene glycol, is between about 1:5 and 2:1, the preferred ratio being between 1:1.5 and 1.5:1. Using this process, with rapid mixing, it takes less than one hour to dissolve 70 grams of foam in 70 grams of diethylene glycol and less than two hours to dissolve 200 grams of foam in 100 grams of diethylene glycol when the temperature of the liquid is maintained at about 190° C. The dissolution rate is faster at higher temperatures. The amounts and rates will, of course, vary with other alcohols and depend on the particular foam used. Additionally, the size of the pieces of foam to be dissolved will affect the time required for dissolution. Generally, foam pieces of about 3"×3"×3" are conveniently used. However, various factors such as reactor size and type of foam will influence the optimum size of foam to be processed according to this invention and both larger and smaller pieces may be used.

Following dissolution, an alkali metal hydroxide catalyst may be added in an amount of at least about 0.1 preferably from about 0.1 to about 10 weight percent, based on the weight of the foam. An amount of between about 0.5 and 3 weight percent is particularly preferred, with about 1.5 weight percent being considered optional. Although any alkali metal hydroxide may be used as a catalyst, sodium hydroxide is preferred. It is relatively inexpensive and does not precipitate out of solution in the presence of carbon dioxide, a hydrolysis reaction by-product. Lithium hydroxide can also be used as a catalyst. However, in this instance a compound such as calcium hydroxide preferably is added. The calcium hydroxide reacts with the carbon dioxide, leaving the lithium hydroxide in solution to function as a catalyst. Otherwise, the lithium hydroxide can react with the carbon dioxide and be removed from the solution as a precipitate. The calcium hydroxide would be added on in an excess amount relative to the lithium hydroxide, preferably in a weight ratio of about 10:1. If a compound such as calcium hydroxide is not added in addition to lithium hydroxide it will be necessary to continue adding lithium hydroxide to the solution in order to maintain the desired concentration of lithium hydroxide catalyst. However, since lithium hydroxide is relatively expensive, this is undesirable.

The solution, which may contain a catalyst, is maintained at a temperature of between about 185° C. and 220° C., preferably about 200° C., while superheated steam is bubbled through the dissolution mixture until substantially all of the carbamates have been hydrolyzed to amines and alcohol. Although the steam is generally bubbled through the solution at a flow rate that insures steam contact time per unit volume of steam in the reactor of between about 1 and about 15 minutes, 5 minutes being preferred, and 1 minute being most preferred, any suitable flow rate may be employed. At a shorter contact time, the unit volume steam will flow through solution more rapidly and thereby remove the amines from solution more rapidly than at a longer contact time. Since it appears that the carbamates do not disappear from solution until most of the amines have been removed by the flowing steam, the contact time will influence the time required for hydrolysis of the carbamates. In a solution formed by dissolving polyurethane foam in diethylene glycol and containing about 1.5 weight percent sodium hydroxide relative to the foam, at a temperature of 200° C., wherein the steam was bubbled through solution at a rate which insured a steam contact time of about 5 minutes per unit volume of steam in the reactor, most of the carbamates were hydrolyzed in 30 minutes. Less than 4 hours was required for complete hydrolysis. Without the addition of the catalyst, hydrolysis takes much longer. The completeness of the hydrolysis reaction is periodically determined by analyzing a sample of the solution for carbamate concentration. This may conveniently be done using high performance liquid chromatography. During hydrolysis, the steam removes the amines as well as some of the alcohol. Therefore, it is necessary to periodically add alcohol to the solution in order to maintain a suitable solvent concentration. The exiting steam, containing amines and alcohol, is cooled by means of a condensor and collected.

The time required for hydrolysis appears to be independent of the particular foam to alcohol ratios used, as long as they are maintained within the limitation of this invention. However, the time may vary based, for example, on the particular alcohol, foam, rate of flow of the steam, temperature and catalyst including amount used.

Figure 2:
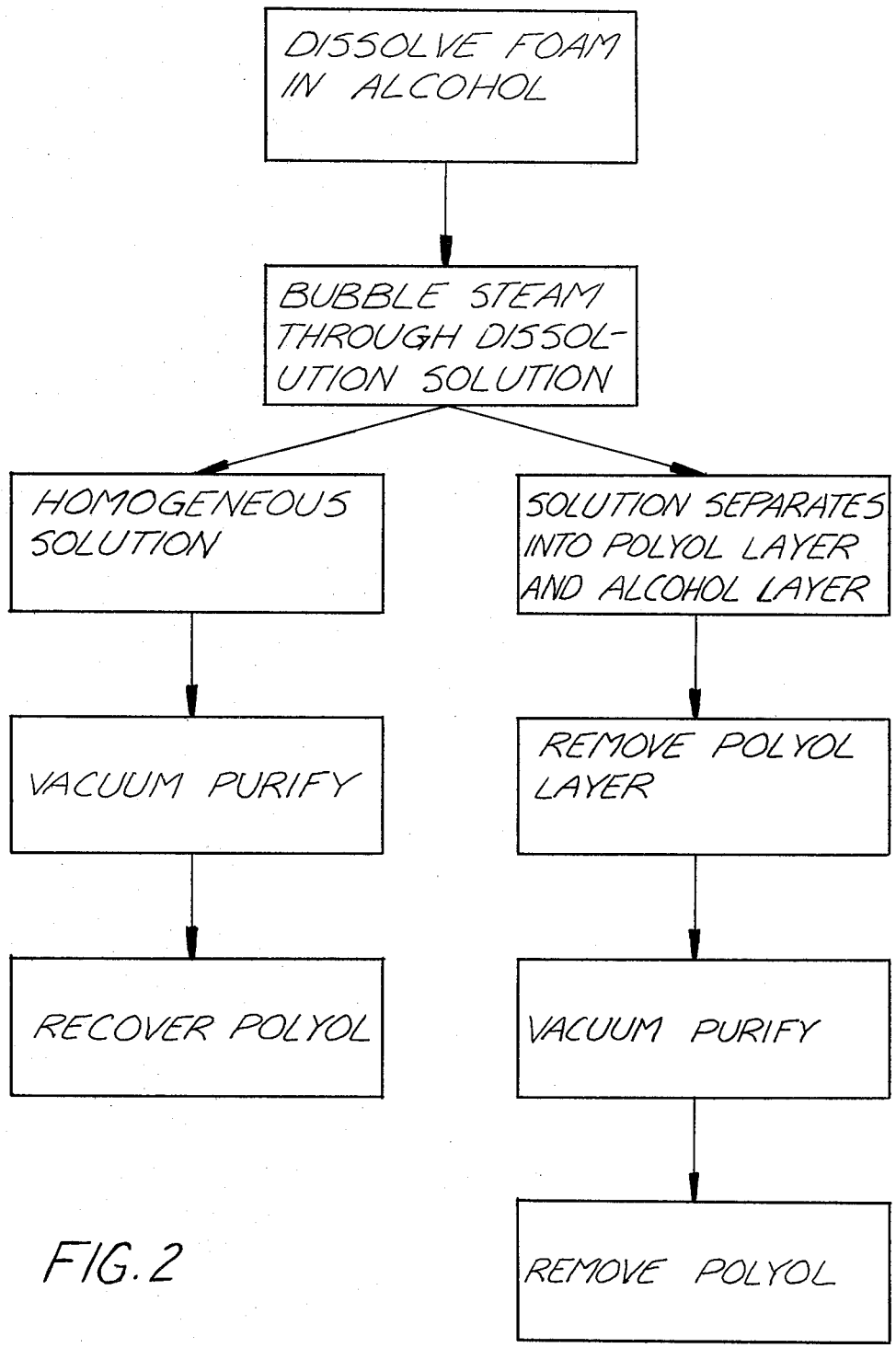
FIG. 2 depicts a schematic flow diagram of the subject process.

After steam hydrolysis, at least a portion of the solution is subjected to vacuum purification at a temperature below about 230° C. to remove any amines, alcohol or water which may be present. Vacuum purification as used in this application includes any process by which end product (polyol) and impurities are separated using vacuum means. Exemplary of such means are conventional distillation apparatus and thin film evaporators. Other apparatus for effecting the desired separation will be apparent to those skilled in the art. The portion of the hydrolyzed solution subjected to vacuum distillation may be the polyol layer which forms after the hydrolyzed solution has been allowed to stand. The occurrence of layer formation, when the solution is allowed to stand, appears dependent on the particular alcohol used. Separation in these instances of layer formation, takes place into a polyol layer and an alcohol layer containing most of the amines. If styrene and/or acrylonitrile was a component of the scrap foam, it will be distributed primarily in the alcohol layer. In the process of the invention wherein diethylene glycol was used, as in the examples, the solution separated into a polyol upper layer and a diethylene glycol lower layer. In this preferred case of layer separation, the polyol layer is removed and this polyol portion of the solution is then subjected to vacuum distillation. If the solution remains homogeneous, the entire solution may be subjected to vacuum distillation. Thereafter, substantially pure polyol is recovered. This process is illustrated in the flow diagram shown in FIG. 2.

The following examples are presented by way of description of the process of the invention and to set forth the best mode contemplated by the inventors but are not to be construed as limiting.

EXAMPLE 1

Six hundred (600 grams) of waste polyurethane foam prepared according to the formulation of Table 1 were dissolved in 600 grams of diethylene glycol by adding 100 gram increments of foam every 10 minutes to the liquid being stirred and maintained at 200° C. Superheated steam at 200° C. was then bubbled through the mixture. The overhead gasses passed through a condenser as shown in FIG. 1. At intervals of 30 minutes, 2 cc samples of the mixture in the reaction vessel were withdrawn and analyzed by high performance liquid chromatography to determine the presence of mono- and biscarbamates of diethylene glycol and the isocyanates used to make the foam. It was found that the carbamates do not disappear from the reaction mixture until most of the amines have been distilled off the reactor by the flowing superheated steam. This required about 8 hours at the rate of steam addition used (300 cc/minute). Since diethylene glycol was also distilling off with the steam, additions of diethylene glycol to the reactor every 15 minutes were required to maintain the reaction volume.

After 8 hours of reaction with bubbling steam, the reactor was allowed to cool. Two layers of liquid formed. The upper layer was found to contain mostly polypropylene ether triols with about 20 percent by weight diethylene glycol and five percent by weight tolylenediamines. This layer was purified by vacuum distillation at 2 mm of mercury absolute pressure and 200° C. in a thin film evaporator to produce 320 grams of a light brown liquid residue. This product was used as a replacement for 5 percent by weight of the Pluracol 535 in the formulation of Table 1. A flexible foam with good resiliency and a density of 2.2 pounds per cubic foot was produced. At higher levels of replacement, foams of lesser quality foams were produced.

TABLE 1

| FORMULATION OF FLEXIBLE POLYURETHANE FOAM | | | |
|---|---|---|---|
| Material Source | | Parts | Description |
| 1. | Pluracol 535 (Polyol) (BASF) | 75 | 1640 eq. wt. mostly triol |
| 2. | Pluracol 581 (Polyol) (BASF) | 25 | 2078 eg. wt. mostly triol; contains styrene and acrylonitrile |
| 3. | Water | 2.8 | Distilled |
| 4. | Amine (Air Prod) | 0.14 | Triethylene diamine |
| 5. | Amine (Air Prod) | 0.20 | Dimethylaminoethylmorpholine |
| 6. | Glycol (Union Carbide) | 0.10 | 70% bis(Dimethylaminoethyl ether 30% dipropylene glycol |
| 7. | Surfactant (Dow Corning) | 14 | Silicone glycol copolymer |
| 8. | Catalyst (M & T) | 0.015 | Dibutyl Tin Dilacrate |
| 9. | Polyisocyanate (Mobay) | 35.78 | Polymeric Isocyanates 20% MDI, 80% TDI |

EXAMPLE 2

The procedure of Example 1 was followed, except that 8 grams of sodium hydroxide were added to the reactor before superheated steam bubbling was started. It was found that nono- and biscarbamates disappear from the reacting mixture within 2 hours of addition of the hydroxide. Vacuum purification of the upper layer of the reaction product as in Example 1 produces 330 grams of a much lighter colored polyol product than in Example 1. Good low density foam can be produced with this product when it replaces 8 percent by weight of Pluracol 535 in the formulation of Table 1.

EXAMPLE 3

The procedure of Example 1 was followed, except 600 grams of glycerol were used instead of diethylene glycol. The dissolution step is slower than in Example 1, requiring 120 minutes to dissolve all of the foam in the hot glycerol. After hydrolysis with superheated steam in the presence of 8 grams of sodium hydroxide, the glycerol and polyol separated quicker than in Example 1. The polyol layer now contained only about 7 percent glycerol, but about 10 percent by weight amines. Vacuum purification at 2 mm of mercury absolute pressure and 220° C. in a thin film evaporator produced a light brown liquid residue containing about 1 percent by weight glycerol and 0.3 percent by weight amines. The product was used as a replacement for 6 percent by weight of the Pluracol 535 in the formulation of Table 1. A flexible foam with good resiliency and a density of 2.2 pounds per cubic foot was produced. At higher levels of replacement, poorer quality foams were produced. In this experiment, however, the additions of glycerol to maintain the volume of the solution were less frequent, only 90 grams of glycerol were needed instead of 250 grams of diethylene glycol as in Example 2.

EXAMPLE 4

The procedure in Example 1 was followed, except 100 grams of foam and 100 grams of 1,6-hexanediol were used. Dissolution of the foam and the alcohol at 200° C. was slower than in glycerol, requiring 150 minutes to dissolve all of the foam. The polyol and hexanediol did not form two separate phases. The diols and amines were removed from the polyol by vacuum purification at 200° C. and 2 mm of mercury absolute pressure in a thin film evaporator. Good low density foam was produced when 4 percent of the Pluracol 535 in the formulation given in Table 1 was replaced by the purification residue from this example. Foams of lesser quality were produced when higher replacement levels were attempted.

In view of this disclosure, many modifications of this invention will be apparent to those skilled in the art. It is intended that all such modifications which fall within the true scope of the invention be included within the terms of the appended claims.

What is claimed is:

1. A process for recovery from polyether polyurethane foam of substantially pure polyether polyol which can be used to make new foam, comprising the steps of:
    (a) forming a solution by dissolving a polyether polyurethane foam in a saturated alcohol having a boiling point between about 225° C. and about 280° C. at a temperature between about 185° C. and about 220° C. under a non-oxidizing atmosphere;
    (b) introducing superheated steam through said solution for a time necessary to substantially hydrolyze dissolution products subject to hydrolysis into amines and alcohol while maintaining said solution temperature between about 185° C. and 220° C. while maintaining reaction volume through the addition of said saturated alcohol to said solution; and
    (c) subjecting at least a portion of said solution to vacuum purification at temperatures below about 230° C. so as to allow recovery therefrom of substantially pure polyether polyol.

2. A process according to claim 1, which further comprises adding an alkali metal hydroxide catalyst to said solution prior to hydrolysis in an amount of at least about 0.1 weight percent based on the weight of said polyurethane foam.

3. A process according to claim 2, wherein said catalyst is added in an amount of between about 0.1 and about 10 weight percent of said polyurethane foam.

4. A process according to claim 3, wherein said catalyst is added in an amount of between about 0.5 and about 3 weight percent of said foam.

5. A process according to claim 4, wherein said catalyst is added in an amount of about 1.5 weight percent of said foam.

6. A process according to claim 2, wherein said catalyst comprises sodium hydroxide.

7. A process according to claim 2, wherein said catalyst comprises lithium hydroxide.

8. A process according to claim 7, wherein calcium hydroxide is added in addition to said lithium hydroxide catalyst in a ratio by weight of about 10:1.

9. A process according to claim 1 or 2, wherein dissolution products subject to hydrolysis into amines and alcohol comprise ureas and carbamates.

10. A process according to claim 1 or 2 wherein the weight ratio of said polyurethane foam to said alcohol is between about 1:5 and 2:1.

11. A process according to claim 10, wherein the weight ratio of said foam to said alcohol is 1:1.

12. A process according to claim 1 or 2, wherein said alcohol is a diol or triol containing an ether linkage.

13. A process according to claim 12, wherein said alcohol is selected from the group consisting essentially of diethylene glycol, dipropylene glycol, dibutylene glycol, glycerol, and propylene ethylene glycol.

14. A process according to claim 13, wherein said alcohol is diethylene glycol.

15. A process according to claim 1 or 2, wherein said portion of said solution subject to vacuum purification is polyol layer which forms when said solution is allowed to stand.

16. A process according to claim 1 or 2, wherein said vacuum purification comprises batch vacuum purification.

17. A process according to claim 1 or 2, wherein said vacuum purification comprises thin film vacuum evaporation.

18. A process according to claim 1 or 2, wherein said steam is bubbled through said solution at a flow rate that insures steam contact time per unit volume of steam of between about 1 and about 15 minutes.

19. A process according to claim 18, wherein said contact time is about 5 minutes.

20. A process according to claim 19, wherein said contact time is about 1 minute.

21. A process for recovery from polyether polyurethane foam of substantially pure polyether polyol which can be used to make new foam, comprising the steps of:
    (a) forming a solution by dissolving a polyether polyurethane foam in diethylene glycol at a temperature between about 185° C. and 220° C. under a steam atmosphere;
    (b) introducing superheated steam through said solution in the presence of a sodium hydroxide catalyst included in an amount of between about 0.1 and 10 weight percent based on the weight of said polyurethane foam for a time necessary to substantially hydrolyze dissolution products subject to hydrolysis into amines and diethylene glycol while maintaining said solution temperature between about 185° C. and 220° C. and while maintaining reaction volume through the addition of said diethylene glycol to said solution; and (c) subjecting at least a portion of said solution to vacuum purification at temperatures below about 230° C. so as to allow recovery therefrom of substantially pure polyether polyol.

22. A process according to claim 21 wherein said steam is introduced through said solution at a flow rate that insures steam contact time per unit volume of steam in the reactor of about 5 minutes and said sodium hydroxide catalyst is included in an amount of between about 0.5 and 3 weight percent based on said polyurethane foam.

* * * * *